Sept. 2, 1941.　　　　H. C. NYE　　　　2,254,708
POWER TRANSMISSION
Filed Feb. 23, 1938
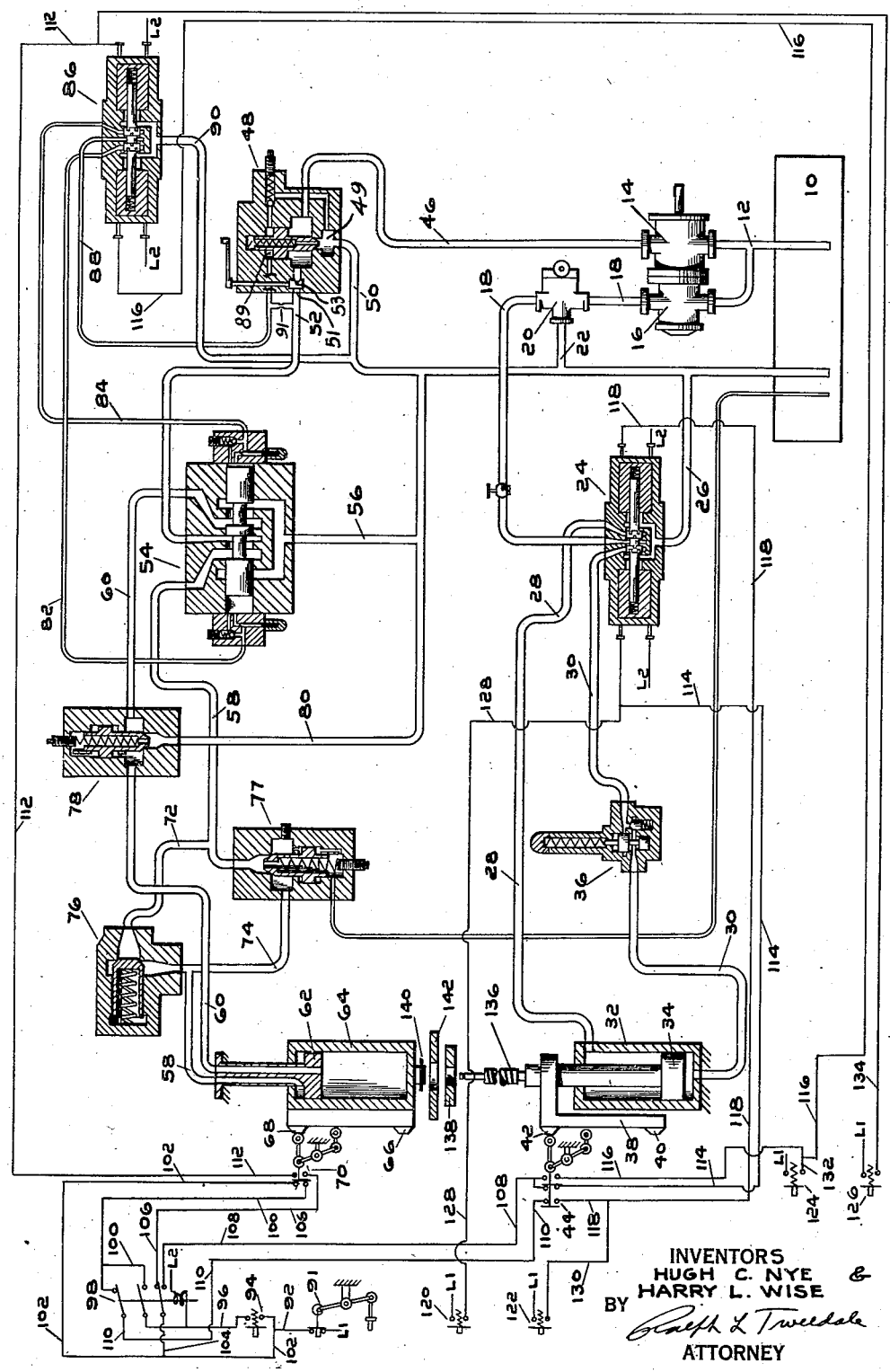
INVENTORS
HUGH C. NYE &
HARRY L. WISE
BY
*Ralph L. Tweedale*
ATTORNEY Patented Sept. 2, 1941

2,254,708

UNITED STATES PATENT OFFICE 2,254,708

POWER TRANSMISSION

Hugh C. Nye and Harry L. Wise, Detroit, Mich., assignors to Vickers Incorporated, Detroit, Mich., a corporation of Michigan Application February 23, 1938, Serial No. 192,028

12 Claims. (Cl. 90—33)

This invention relates to power transmissions and more particularly to those of the fluid type wherein a power transmitting fluid, such as oil, and hereinafter referred to as such, is utilized for the transmission of power between one or more pumps and one or more fluid motors.

The invention is particularly concerned with a power transmission system adapted for operating a plurality of hydraulic motors in predetermined sequence and may be used, for example, on a hydraulically operated broaching machine. Broaching machines of the type which pull a broaching tool through a work piece are frequently provided with a hydraulically operated main ram and also with a hydraulically operated tool handling cylinder for holding and retracting the tool by its opposite end while it is disconnected from the main ram for insertion of a fresh work piece.

It is an object of the present invention to provide a hydraulic power transmission system particularly adapted for such use and in which the hydraulic motors are caused to move through a predetermined cycle automatically.

A further object is to provide a hydraulic system of the character described wherein the pump means which forms the hydraulic power supply will be unloaded when the machine is stopped and also in which all electric control circuits will be deenergized when the machine is stopped.

It is also an object to provide an improved hydraulic power transmission system including a relief valve which may be opened by venting a control chamber thereof and wherein the fluid vented from the control chamber may be utilized for supplying a pilot circuit.

A further object is to provide a power transmission for operating a broaching machine wherein the force which can be applied to the broaching tool on the return stroke as it engages the tool handling apparatus is limited to prevent breakage.

Further objects and advantages of the present invention will be apparent from the following description, reference being had to the accompanying drawing wherein a preferred form of the present invention is clearly shown.

In the drawing, the single figure is a diagrammatic view of the hydraulic power transmission system incorporating a preferred form of the present invention.

A tank 10 is provided containing a supply of oil which may be withdrawn through a suction conduit 12 by a pair of mechanically connected pumps 14 and 16, adapted to be driven by a suitable prime mover, such as an electric motor, not shown. The pump 16 has a discharge conduit 18 in which a conventional relief valve 20 may be inserted for by-passing oil to the tank through a conduit 22 whenever a predetermined pressure is exceeded in the conduit 18.

The conduit 18 leads to the pressure port of a solenoid operated, spring centered, open center, four-way valve 24, which has its tank port connected to tank by a conduit 26. The cylinder ports are connected by conduits 28 and 30 to the rod and head ends, respectively, of a tool handling cylinder 32 in which a piston 34 is reciprocably mounted. The conduit 30 has interposed therein a combined back pressure and check valve 36 which is open to free flow of oil into the cylinder but prevents back flow until the pressure in the head end of the cylinder 32 exceeds a predetermined value which is greater than the pressure produced by the gravity load on piston 34. The piston 34 carries a bracket 38 having suitable cams 40 and 42 for actuating a snap switch 44 at the top and bottom ends of the stroke of the piston 34.

The discharge of the pump 14 is connected by a conduit 46 to a combined flow control and relief valve 48 which may be similar to that shown in the patent to Harry F. Vickers, #2,102,865. The exhaust port 49 of relief valve 48 is connected by a conduit 50 to the tank. The controlled flow port 51 of the valve 48 has an adjustable restrictor 53 and is connected by a conduit 52 to the pressure port of a servo-operated, closed center, four-way valve 54. The tank port of the valve 54 is connected by a conduit 56 to tank. The cylinder ports of the valve 54 are connected by conduits 58 and 60, to the rod and head sides, respectively, of a fixed piston 62 on which is reciprocably mounted a cylinder 64. The cylinder 64 carries a pair of cams 66 and 68 for actuating a snap switch 70 at the top and bottom ends of the cylinder stroke. The conduit 58 is provided intermediate at its ends with two parallel branch portions 72 and 74 in the former of which a check valve 76 is incorporated, which is open to free flow of oil into the cylinder 64. The branch 74 contains a back pressure valve 77 which blocks back flow from the head end of cylinder 64 until a predetermined pressure, greater than the gravity load, is produced in the head end of cylinder 64.

The conduit 60 has interposed therein a low pressure relief valve 78 for relieving oil to the tank through a conduit 80 whenever a predetermined pressure is exceeded in the conduit 60. The valve 78 is normally set to open at a considerable lower pressure than the relief valve 48. The actuating chambers of the valve 54 are connected by conduits 82 and 84 to the cylinder ports of a solenoid operated, spring centered, open center, four-way valve 86. The pressure port of valve 86 is connected by a conduit 88 to the control chamber 89 of the valve 48 while the tank port of valve 86 is connected to tank by conduit 90. A restricted conduit 91 connects between conduits 52 and 88.

For the purpose of controlling the solenoid operated valves 24 and 86, an electric circuit is provided as follows: A snap acting stop-run switch 91 connects from one side of a suitable power line L1 by a conductor 92 to a push button starting switch 94. The latter connects by a conductor 96 to the operating coil of relay 98, having three controlled circuits, the upper one of which is normally closed, the middle one is normally opened and the bottom one is double throw. The other side of the operating coil of relay 98 connects to the other side of the line L2. The middle circuit of the relay 98 is connected as a holding circuit by a conductor 100 which extends through one circuit of the switch 70 and by a conductor 102 to conductor 92 and line L1. The lower circuit of the relay 98 connects by a conductor 104 to the conductor 102 and by conductors 106 and 108 to the snap switches 70 and 44, respectively. The upper circuit of the relay 98 connects between the conductor 100 and a conductor 110 which extends to another circuit of the snap switch 44. The snap switch 70, in the position illustrated, closes the connection between the conductors 100 and 102. When moved to the opposite position it connects conductor 106 with a conductor 112 leading to the right hand solenoid of the valve 86, the other side of which is connected to line L2. The snap switch 44 in the position shown, is adapted to connect conductor 108 with a conductor 114, leading to the left hand solenoid of the valve 24, the other side of which is connected to line L2. When moved to the opposite direction, switch 44 connects conductor 108 with a conductor 116 which leads to the left hand solenoid of valve 86, and thence to the line L2. In this position, the switch 44 also connects conductor 110 with a conductor 118, leading to the right hand solenoid of valve 24 and thence to line L2.

For the purpose of "inching" the cylinder 64 or the piston 34 momentary contact switches 120, 122, 124 and 126 may be provided. The switch 120, when depressed, is adapted to connect line L1 to the left hand solenoid of valve 24 through a conductor 128, leading to the conductor 114. Switch 122, when depressed, connects line L1 to the right hand solenoid of valve 24 by a conductor 130, leading to the conductor 118. Switch 124, when depressed, is adapted to connect line L1 to the left hand solenoid of valve 86 by a conductor 132, connected to the conductor 116. Switch 126 is adapted, when depressed, to connect line L1 to the right hand solenoid of valve 86 by a conductor 134.

As an example of the manner in which the hydraulic system may be applied the piston 34 is shown as having a socket for reception of a broaching tool 136. The tool 136 may be lifted by the piston 34 to insert the upper end of the tool through a hole in a suitable work piece 138 and to engage the tool in a suitable clutch 140 carried by the cylinder 64. The cylinder 64 may then be raised to pull the tool through the work which is held against movement by the abutment 142.

In operation with the pumps 14 and 16 running and with the parts in position shown, oil delivered by pump 16 is by-passed through conduit 18, valve 24 and conduit 26 to the tank, since the valve 24 is spring centered and in its center position connects the presure and tank ports. The pump 14 is by-passed through conduit 46, relief valve 48 and conduit 50 to the tank. Since open center valve 86 is in its spring centered position, the vent conduit 88 is connected to tank through conduit 90 and relief valve 48 is accordingly maintained open without substantial resistance.

When the starting switch 94 is closed the relay 98 is energized and remains energized through the holding circuit 100, switch 70, and conductor 102. Closing of the relay 98 establishes a circuit from line L1 through switch 91, conductor 102, conductor 104, relay 98, conductor 108, switch 44 and conductor 114 to the left hand solenoid of valve 24. The latter moves to the left connecting pressure oil to the conduit 30, so that oil delivered by the pump 16 flows through conduit 18, valve 24, conduit 30 and valve 36, which is open to free flow in this direction, to the head end of the cylinder 32. The piston 34, accordingly, moves upwardly carrying with it the tool 136 which enters the work piece 138 and engages the tool clutch 140 on the cylinder 64. Oil returns from the rod end of cylinder 32 through conduit 28, valve 24 and conduit 26 to tank. As the piston 34 reaches the top of its stroke, snap switch 44 is shifted which breaks the circuit to the left hand solenoid of valve 24 and establishes a circuit from the conductor 108 to the conductor 116 and the left hand solenoid of valve 86. The latter shifts to the left connecting the pressure port with conduit 82. The oil from the vent port of valve 48 is accordingly led to the left hand actuating chamber of valve 54, shifting the same to the left, as shown. As soon as this movement is completed, pressure builds up in the control chamber of relief valve 48, causing the same to close and pressure oil flows from pump 14 through conduit 46, valve 48, conduit 52, valve 54, conduit 58, branch conduit 72, check valve 76 and conduit 58 to rod end of the cylinder 64. The latter starts upwardly, pulling the tool 136 through the work piece to perform the broaching stroke. Oil returning from the head end flows through conduit 60, valve 54 and conduit 56 to tank.

As the cylinder 64 reaches the top of its stroke, switch 70 is shifted to break the holding circuit for relay 98, permitting the same to open, thus connecting conductor 106 to line L1 through conductors 104, 102 and 92. Switch 70 also establishes a circuit connecting conductor 106 with conductor 112 which leads to the right hand solenoid of valve 86. The latter shifts to the right connecting the pressure port with conduit 84, so that the vent oil from valve 48 is permitted to pass through conduit 88, valve 86, conduit 84 to the right hand chamber of the valve 54, shifting the same to the right and connecting the pressure port with conduit 60. Pressure oil from the pump 14 accordingly flows from the conduit 52 through the conduit 60 and relief valve 78 to the head end of cylinder 64 moving the same downwardly at a reduced pressure determined by the setting of the valve 78. Oil returning from the rod end first builds up sufficient pressure to open valve 77 and then flows through conduit 58, valve 54 and conduit 56 to tank.

As the cylinder 64 reaches the lower limit of its stroke, switch 70 again shifts to the position shown in the drawing, breaking the circuit to the right hand solenoid of valve 86 and establishing a circuit between conductors 100 and 102. This energizes the right hand solenoid of valve 24 through a circuit extending from line L1 through switch 91, conductor 92, conductor 102, switch 70, conductor 100, upper circuit of relay 98, conductor 110, left hand circuit of switch 44 and conductor 118. The valve 24 shifts to the right, connecting the pressure port with the conduit 28. Oil from the pump 16 accordingly flows through the conduit 18, valve 24 and conduit 28 to the rod end of cylinder 32, causing the piston 34 to move downwardly carrying the tool 136 to provide clearance for insertion of a fresh work piece. Oil returning from the head end, first builds up sufficient pressure to open valve 36 and then flows through conduit 30, valve 24 and conduit 26 to tank. As the piston 34 reaches the bottom of its stroke, switch 44 shifts, breaking the circuit to the right hand solenoid of valve 24 and permitting the latter to spring center and by-pass the discharge of pump 16 to the tank.

The operating cycle is thus completed with the electric circuits all open and with both pumps by-passed. Another cycle may again be started by depressing the starting switch 94. If at any time during the cycle an emergency should arise, necessitating the immediate stopping of the device, the emergency switch 91 may be opened thus deenergizing all circuits and permitting both valves 24 and 48 to spring center and by-pass the pumps 14 and 16. If during the set-up of the machine or try-out thereof it is necessary to "inch" the cylinder 64 up, the switch 124 may be depressed thus energizing the left hand solenoid of valve 86 as long as the switch is closed. To move the cylinder 64 downwardly the switch 126 is closed similarly energizing the right hand solenoid of valve 86. Piston 34 may be inched upwardly or downwardly in a similar manner by the push button 120 or 122, respectively.

It will be noted that the particular connection between the vent controlled relief valve 48, pilot valve 86 and servo-operated valve 54 is such that the supply of fluid for servo operation is taken from the control chamber 89 of the valve 48. Since this chamber is separated from the chamber beneath it, which is in the main supply conduit 46, by the free floating piston of the relief valve itself, the pressure in control chamber 89 cannot fall below main line pressure without causing the valve to open. This feature presents a distinct advantage in that it causes a smooth reversal to take place at the end of the stroke of the main ram. Thus, whenever pilot valve 86 is shifted, a free path is opened from control chamber 89 through conduit 88, pilot valve 86 and conduit 82 or 84, as the case may be. The easiest path of escape through this conduit is for the fluid to push the spool of valve 54 ahead of it which, of course, imposes comparatively little resistance. Thus the pressure in control chamber 89 is reduced, and relief valve 48 is permitted to open which accordingly reduces the main line pressure. As soon as the shifting of valve 54 is completed, pressure in control chamber 89 again builds up to equal the pressure in the main line 46. Thus, during the actual period while reversal is taking place, the pump delivery is momentarily bypassed through relief valve 48 at a reduced pressure, and this materially contributes to a smooth reversal of the main ram 64. This is particularly true because it permits the usual throttles at the end chambers of valve 54 which determine the speed of shifting thereof to be adjusted for a slower shifting than would otherwise be feasible.

While the form of embodiment of the invention as herein disclosed, constitutes a preferred form, it is to be understood that other forms might be adopted, all coming within the scope of the claims which follow.

What is claimed is as follows:

1. In a hydraulic power transmission system the combination of a first fluid motor, a second fluid motor, pump means for supplying pressure fluid to operate said motors, electrically operable control means for selectively by-passing the pump means or causing operation of the first motor in either direction, electrically operable control means for selectively by-passing the pump means or causing operation of the second motor in either direction, an electric circuit operably connected to said control means, a manually operable switch for energizing the control means to start operation of the first motor, switch means operated by the fluid motors for energizing the control means to cause said motors to operate in a predetermined sequence and motor operated switch means effective at the end of said sequence to deenergize both said control means and cause the pump means to be by-passed.

2. In a hydraulic power transmission system the combination of a first fluid motor, a second fluid motor, pump means for supplying pressure fluid to operate said motors, electrically operable means for controlling the delivery of fluid to said motors individually, a first snap switch operated by the first motor at opposite ends of its stroke, a second snap switch operated by the second motor at opposite ends of its stroke, a manually controlled switch, an electric circuit connecting the control means and the switches and arranged when the manual switch is operated to cause a cycle of operations including a forward stroke of the first motor, a forward and a reverse stroke of the second motor, and a reverse stroke of the first motor in sequence, said control means being deenergized at the end of said cycle.

3. In a hydraulic broaching machine of the type having a main slide and a tool handling slide, the combination of a first fluid motor operably connected to the tool handling slide, a second fluid motor operably connected to the main slide, pump means for supplying fluid to operate said motors, electrically operated means for controlling operation of said motors individually, an electric circuit operably connected to said control means, switch means in said circuit operable upon predetermined movement of said slides to variably energize said control means for causing a cycle of tool handling and broaching operations and including means for deenergizing the control means at the end of a cycle.

4. In a hydraulic broaching machine of the type having a main slide and a tool handling slide, the combination of a first fluid motor operably connected to the tool handling slide, a second fluid motor operably connected to the main slide, pump means for supplying fluid to operate said motors, electrically operated means for controlling operation of said motors individually, an electric circuit operably connected to said control means, switch means in said circuit operable upon predetermined movement of said slides to variably energize said control means for causing a cycle of tool handling and broaching operations and including means for deenergizing the control means at the end of a cycle, said control means including valve means for by-passing the pump means while the control means is deenergized.

5. In a hydraulic broaching machine of the type having a main slide and a tool handling slide, the combination of a first fluid motor operably connected to the tool handling slide, a second fluid motor operably connected to the main slide, pump means for supplying fluid to operate said motors, electrically operated means for controlling operation of said motors individually, an electric circuit operably connected to said control means, and means operated by one of said slides for opening said circuit and deenergizing the control means to stop operation of said motors.

6. In a hydraulic power transmission system the combination with a source of fluid under pressure, a fluid motor operable on fluid supplied from said source, a valve for relieving fluid from said source to a point of lower pressure, said valve having a control chamber in restricted communication with said source, a servo operated valve for controlling the flow of operating fluid to the motor and a pilot valve and connections between the servo valve and the control chamber for connecting the control chamber selectively to a point of lower pressure for opening the relief valve or to the servo valve for operating the same.

7. In a hydraulic power transmission system the combination with a source of fluid under pressure, a fluid motor operable on fluid supplied from said source, a valve for relieving fluid from said source to a point of lower pressure, said valve having a control chamber in restricted communication with said source, a servo operated valve for controlling the flow of operating fluid to the motor and an open center, four-way pilot valve and connections between the servo valve and the control chamber for connecting the control chamber selectively to a point of lower pressure for opening the relief valve or to the servo valve for operating the same.

8. In a hydraulic broaching machine of the type having a main slide and a tool handling slide, the combination of a first fluid motor operably connected to the tool handling slide, a second fluid motor operably connected to the main slide, pump means for supplying fluid to operate said motors, valve means for controlling the supply of fluid to said motors, relief valve means for limiting the maximum pressure applicable to said motors under all conditions and a second relief valve communicating with one end of one of the motors only for limiting the pressure applicable to that motor on the return stroke as the tool is compressively stressed between the two slides.

9. In a hydraulic broaching machine of the type having a main slide and a tool handling slide, the combination of a first fluid motor operably connected to the tool handling slide, a second fluid motor operably connected to the main slide, pump means for supplying fluid to operate said motors, valve means for controlling the supply of fluid to said motors, relief valve means for limiting the maximum pressure applicable to said motors under all conditions and a second relief valve communicating with the return end of the main motor only for limiting the pressure applicable to that motor on the return stroke as the tool is compressively stressed between the two slides.

10. In a hydraulic power transmission system the combination with a source of fluid under pressure, a fluid motor operable on fluid supplied from said source, a valve for relieving fluid from said source to a point of lower pressure, said valve having a control chamber in restricted communication with said source, means for controlling the flow of operating fluid to the motor, a servo motor for operating said means, and a pilot valve and connections between the servo motor and the control chamber for connecting the control chamber selectively to a point of lower pressure for opening the relief valve or to the servo motor for operating the same.

11. In a hydraulic power transmission system the combination with a source of fluid under pressure, a fluid motor operable on fluid supplied from said source, a valve for relieving fluid from said source to a point of lower pressure, said valve having a control chamber in restricted communication with said source, means for controlling the flow of operating fluid to the motor, a servo motor for operating said means, and an open-center, four-way pilot valve and connections between the servo motor and the control chamber for connecting the control chamber selectively to a point of lower pressure for opening the relief valve or to the servo motor for operating the same.

12. In a hydraulic power transmission system the combination with a source of fluid under pressure, a fluid motor operable on fluid supplied from said source, a valve for relieving fluid from said source to a point of lower pressure, said valve having a control chamber in restricted communication with said source, said control chamber when vented providing a path for fluid to escape for opening said valve, a servo-operated reversing device for causing fluid flow to the motor in one direction or the other, a pilot valve for controlling the shifting of the servo-operated member, and means supplying fluid to the pilot valve from said control chamber whereby the reduced resistance which the servo-operated member imposes during shifting causes the first valve to open and reduce the pressure at the source.

HUGH C. NYE.
HARRY L. WISE.